United States Patent
Diamond

(10) Patent No.: US 7,324,111 B2
(45) Date of Patent: Jan. 29, 2008

(54) METHOD AND APPARATUS FOR ROUTING GRAPHICS PROCESSING SIGNALS TO A STAND-ALONE MODULE

(75) Inventor: Michael B. Diamond, Los Gatos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 278 days.

(21) Appl. No.: 10/879,877

(22) Filed: Jun. 28, 2004

(65) Prior Publication Data

US 2005/0228928 A1    Oct. 13, 2005

Related U.S. Application Data

(63) Continuation-in-part of application No. 10/822,015, filed on Apr. 9, 2004.

(51) Int. Cl.
*G06F 13/14* (2006.01)
(52) U.S. Cl. ........................ 345/520; 345/501
(58) Field of Classification Search ................. 345/520
See application file for complete search history.

(56) References Cited

U.S. PATENT DOCUMENTS

| | | | |
|---|---|---|---|
| 4,857,002 A * | 8/1989 | Jensen et al. | 439/76.1 |
| 5,493,542 A | 2/1996 | Odelid et al. | |
| 6,380,616 B1 * | 4/2002 | Tutsch et al. | 257/686 |
| 6,724,389 B1 * | 4/2004 | Wilen et al. | 345/520 |
| 7,007,159 B2 * | 2/2006 | Wyatt | 713/1 |
| 2003/0131172 A1 | 7/2003 | Lin et al. | |
| 2004/0246198 A1 * | 12/2004 | Sahashi | 345/3.1 |
| 2005/0190536 A1 * | 9/2005 | Anderson et al. | 361/686 |
| 2005/0273824 A1 * | 12/2005 | Matic | 725/80 |

FOREIGN PATENT DOCUMENTS

| | | |
|---|---|---|
| CA | 2430040 | 12/2003 |
| EP | 1372069 | 12/2003 |
| WO | WO 03/092267 | 11/2003 |

\* cited by examiner

*Primary Examiner*—Kee M. Tung
*Assistant Examiner*—Motilewa Good-Johnson
(74) *Attorney, Agent, or Firm*—Patterson & Sheridan LLP

(57) ABSTRACT

One embodiment of a connector for a stand-alone graphics module is adapted for coupling a computing device to the stand-alone graphics module, which is external to the computing device. The connector is adapted for receiving a PCI express signal from the computing device and for delivering the PCI express signal to the stand-alone graphics module. The connector is further adapted for receiving display output signals from the stand-alone graphics module and delivering the display output signals to the computing system, e.g., for use in accordance with one or more output display panels coupled to said computing device.

16 Claims, 10 Drawing Sheets

| Pin# | Signal Name | Pin# | Signal Name |
|---|---|---|---|
| 1 | PWR_SRC | 2 | 5VRUN |
| 3 | PWR_SRC | 4 | RUNPWROK# |
| 5 | PWR_SRC | 6 | 1V8RUN |
| 7 | PWR_SRC | 8 | 1V8RUN |
| 9 | PWR_SRC | 10 | 1V8RUN |
| 11 | PWR_SRC | 12 | 1V8RUN |
| 13 | PWR_SRC | 14 | 1V8RUN |
| 15 | PWR_SRC | 16 | 1V8RUN |
| 17 | GND | 18 | 1V8RUN |
| 19 | GND | 20 | GND |
| 21 | GND | 22 | GND |
| 23 | GND | 24 | GND |
| 25 | KEY | 26 | KEY |
| 27 | KEY | 28 | KEY |
| 29 | KEY | 30 | KEY |
| 31 | KEY | 32 | KEY |
| 33 | KEY | 34 | KEY |
| 35 | KEY | 36 | KEY |
| 37 | PEX_RX15# | 38 | PRSNT2# |
| 39 | PEX_RX15 | 40 | PEX_TX15# |
| 41 | GND | 42 | PEX_TX15 |
| 43 | PEX_RX14# | 44 | GND |
| 45 | PEX_RX14 | 46 | PEX_TX14# |
| 47 | GND | 48 | PEX_TX14 |
| 49 | PEX_RX13# | 50 | GND |
| 51 | PEX_RX13 | 52 | PEX_TX13# |
| 53 | GND | 54 | PEX_TX13 |
| 55 | PEX_RX12# | 56 | GND |
| 57 | PEX_RX12 | 58 | PEX_TX12# |
| 59 | GND | 60 | PEX_TX12 |
| 61 | PEX_RX11# | 62 | GND |
| 63 | PEX_RX11 | 64 | PEX_TX11# |
| 65 | GND | 66 | PEX_TX11 |
| 67 | PEX_RX10# | 68 | GND |
| 69 | PEX_RX10 | 70 | PEX_TX10# |
| 71 | GND | 72 | PEX_TX10 |
| 73 | PEX_RX9# | 74 | GND |
| 75 | PEX_RX9 | 76 | PEX_TX9# |
| 77 | GND | 78 | PEX_TX9 |
| 79 | PEX_RX8# | 80 | GND |
| 81 | PEX_RX8 | 82 | PEX_TX8# |
| 83 | GND | 84 | PEX_TX8 |
| 85 | PEX_RX7# | 86 | GND |

| Pin# | Signal Name | Pin# | Signal Name |
|---|---|---|---|
| 87 | PEX_RX7 | 88 | PEX_TX7# |
| 89 | GND | 90 | PEX_TX7 |
| 91 | PEX_RX6# | 92 | GND |
| 93 | PEX_RX6 | 94 | PEX_TX6# |
| 95 | GND | 96 | PEX_TX6 |
| 97 | PEX_RX5# | 98 | GND |
| 99 | PEX_RX5 | 100 | PEX_TX5# |
| 101 | GND | 102 | PEX_TX5 |
| 103 | PEX_RX4# | 104 | GND |
| 105 | PEX_RX4 | 106 | PEX_TX4# |
| 107 | GND | 108 | PEX_TX4 |
| 109 | PEX_RX3# | 110 | GND |
| 111 | PEX_RX3 | 112 | PEX_TX3# |
| 113 | GND | 114 | PEX_TX3 |
| 115 | PEX_RX2# | 116 | GND |
| 117 | PEX_RX2 | 118 | PEX_TX2# |
| 119 | GND | 120 | PEX_TX2 |
| 121 | PEX_RX1# | 122 | GND |
| 123 | PEX_RX1 | 124 | PEX_TX1# |
| 125 | GND | 126 | PEX_TX1 |
| 127 | PEX_RX0# | 128 | GND |
| 129 | PEX_RX0 | 130 | PEX_TX0# |
| 131 | GND | 132 | PEX_TX0 |
| 133 | PEX_REFCLK# | 134 | PRSNT1# |
| 135 | PEX_REFCLK | 136 | TV_C |
| 137 | CLK_REQ# | 138 | GND |
| 139 | PEX_RST# | 140 | TV_Y |
| 141 | RSVD | 142 | GND |
| 143 | RSVD | 144 | TV_CVBS |
| 145 | SMB_DAT | 146 | GND |
| 147 | SMB_CLK | 148 | VGA_RED |
| 149 | THERM# | 150 | GND |
| 151 | VGA_HSYNC | 152 | VGA_GRN |
| 153 | VGA_VSYNC | 154 | GND |
| 155 | DDCA_CLK | 156 | VGA_BLU |
| 157 | DDCA_DAT | 158 | GND |
| 159 | IGP_UCLK# | 160 | LVDS_UCLK# |
| 161 | IGP_UCLK | 162 | LVDS_UCLK |
| 163 | GND | 164 | GND |
| 165 | IGP_UTX3# / RSVD | 166 | LVDS_UTX3# |
| 167 | IGP_UTX3 / RSVD | 168 | LVDS_UTX3 |
| 169 | RSVD | 170 | GND |

FIG. 4A

| Pin# | Signal Name | Pin# | Signal Name |
|---|---|---|---|
| 171 | IGP_UTX2# | 172 | LVDS_UTX2# |
| 173 | IGP_UTX2 | 174 | LVDS_UTX2 |
| 175 | GND | 176 | GND |
| 177 | IGP_UTX1# | 178 | LVDS_UTX1# |
| 179 | IGP_UTX1 | 180 | LVDS_UTX1 |
| 181 | GND | 182 | GND |
| 183 | IGP_UTX0# | 184 | LVDS_UTX0# |
| 185 | IGP_UTX0 | 186 | LVDS_UTX0 |
| 187 | GND | 188 | GND |
| 189 | IGP_LCLK# / DVI_B_CLK# | 190 | LVDS_LCLK# |
| 191 | IGP_LCLK / DVI_B_CLK | 192 | LVDS_LCLK |
| 193 | DVI_B_HPD / GND | 194 | GND |
| 195 | IGP_LTX3# / RSVD | 196 | LVDS_LTX3# |
| 197 | IGP_LTX3 / RSVD | 198 | LVDS_LTX3 |
| 199 | GND | 200 | GND |
| 201 | IGP_LTX2# / DVI_B_TX2# | 202 | LVDS_LTX2# |
| 203 | IGP_LTX2 / DVI_B_TX2 | 204 | LVDS_LTX2 |

| Pin# | Signal Name | Pin# | Signal Name |
|---|---|---|---|
| 205 | GND | 206 | GND |
| 207 | IGP_LTX1# / DVI_B_TX1# | 208 | LVDS_LTX1# |
| 209 | IGP_LTX1 / DVI_B_TX1 | 210 | LVDS_LTX1 |
| 211 | GND | 212 | GND |
| 213 | IGP_LTX0# / DVI_B_TX0# | 214 | LVDS_LTX0# |
| 215 | IGP_LTX0 / DVI_B_TX0 | 216 | LVDS_LTX0 |
| 217 | DVI_A_HPD | 218 | GND |
| 219 | DVI_A_CLK# | 220 | DDCC_DAT |
| 221 | DVI_A_CLK | 222 | DDCC_CLK |
| 223 | GND | 224 | LVDS_PPEN |
| 225 | DVI_A_TX2# | 226 | LVDS_BL_BRGHT |
| 227 | DVI_A_TX2 | 228 | LVDS_BLEN |
| 229 | GND | 230 | DDCB_DAT |
| 231 | DVI_A_TX1# | 232 | DDCB_CLK |
| 233 | DVI_A_TX1 | 234 | 2V5RUN |
| 235 | GND | 236 | GND |
| 237 | DVI_A_TX0# | 238 | 3V3RUN |
| 239 | DVI_A_TX0 | 240 | 3V3RUN |
| 241 | GND | 242 | 3V3RUN |

FIG. 4B

| Signal Name | Input/Output | Description |
|---|---|---|
| DVI_A_TX0-2, DVI_A_TX0-2# | Output, 100 Ohm Diff | TMDS output for either single link DVI or dual link DVI |
| DVI_A_CLK, DVI_A_CLK# | Output, 100 Ohm Diff | TMDS clock for either single link DVI or dual link DVI |
| DVI_A_HPD | Input | TMDS panel detect |
| DVI_B_TX0-2, DVI_B_TX0-2# | Output, 100 Ohm Diff | TMDS output for either single link DVI or dual link DVI, upper bits for dual-link; Note: these pins are shared with IGP LVDS loop through pins |
| DVI_B_CLK, DVI_B_CLK# | Output, 100 Ohm Diff | TMDS clock, only used for second single-link DVI. Note: these pins are shared with IGP LVDS loop through pins |
| DVI_B_HPD | Input/GND | TMDS panel detect, only used for second single-link DVI. Tie to GND on motherboard if notebook is configured for IGP LVDS pass through |
| DDCA_CLK | Output, 3.3 V logic levels | Serial link, can connect to VGA, DVI-A or DVI-B. Configuration needs to be stored in MXM system information ROM |
| DDCA_DAT | BI-Directional | Serial link, can connect to VGA, DVI-A or DVI-B. Configuration needs to be stored in MXM system information ROM |
| DDCB_CLK | Output, 3.3 V logic levels | Serial link, can connect to VGA, DVI-A or DVI-B. Configuration needs to be stored in MXM system information ROM |
| DDCB_DAT | BI-Directional | Serial link, can connect to VGA, DVI-A or DVI-B. Configuration needs to be stored in MXM system information ROM |
| LVDS_PPEN | Output, 3.3 V logic levels | LVDS Panel Power enable |
| LVDS_BLEN | Output, 3.3 V logic levels | LVDS Panel backlight enable |
| LVDS_BL_BRGHT | PWM Output | LVSD Panel brightness control, duty cycle determines output level |
| LVDS_UTX0-3, LVDS_UTX0-3# | Output, 100 Ohm Diff | LVDS output for dual link |
| IGP_UTX0-2, IGP_UTX0-2# | Input, 100 Ohm Diff | LVDS input that loops back to LVDS_UTX0-2, LVDS_UTX0-2# to provide path for LVDS with IGP only. Note: these pins are shared with DVI_B pins |
| LVDS_UCLK, LVDS_UCLK# | Output, 100 Ohm Diff | LVDS clock for dual link |

FIG. 5A

| Signal Name | Input/Output | Description |
| --- | --- | --- |
| IGP_UCLK, IGP_UCLK# | Input, 100 Ohm Diff | LVDS input that loops back to LVDS_UCLK, LVDS_UCLK# to provide path for LVDS with IGP only. Note: these pins are shared with DVI_B pins |
| LVDS_LTX0-3, LVDS_LTX0-3# | Output, 100 Ohm Diff | LVDS output for either single link or dual link |
| IGP_LTX0-2, IGP_LTX0-2# | Input, 100 Ohm Diff | LVDS input that loops back to LVDS_LTX0-2, LVDS_LTX0-2# to provide path for LVDS with IGP only. Note: these pins are shared with DVI_B pins |
| LVDS_LCLK, LVDS_LCLK# | Output, 100 Ohm Diff | LVDS clock for either single link or dual link |
| IGP_LCLK, IGP_LCLK# | Input, 100 Ohm Diff | LVDS input that loops back to LVDS_LCLK, LVDS_LCLK# to provide path for LVDS with IGP only. Note: these pins are shared with DVI_B pins |
| TV_Y | Output, 37.5 Ohm +/- 2 Ohms | TV_OUT Chroma |
| TV_C | Output, 37.5 Ohm +/- 2 Ohms | TV_OUT Luma |
| TV_CVBS | Output, 37.5 Ohm +/- 2 Ohms | TV_OUT Composite |
| DDCC_CLK | Output, 3.3 V logic levels | Serial link, connect to EDID LVDS Panel and to MXM System Information ROM. This link is not to be used for external interfaces |
| DDCC_DAT | Bi-Directional | Serial link, connect to EDID LVDS Panel and to MXM System Information Rom. This link is not to be used for external interfaces |
| VGA_BLU | Output, 37.5 Ohm +/- 2 Ohms | RGB Output |
| VGA_RED | Output, 37.5 Ohm +/- 2 Ohms | RGB Output |
| VGA_GRN | Output, 37.5 Ohm +/- 2 Ohms | RGB Output |
| VGA_HSYNC | Output, 75 Ohm, 3.3 V logic levels | RGB Horizontal Sync |
| VGA_VSYNC | Output, 75 Ohm, 3.3 V logic levels | RGB Vertical Sync |
| SMB_CLK | Input, 5 V tolerant | Serial link for thermal sensor on GPU. Connect to motherboard's SMBus Clock signal. |
| SMB_DAT | Bi-Dir, 5 V tolerant | Serial link for thermal sensor on GPU. Connect to motherboard's SMBus Data signal. |
| THERM# | Output, active low | Indicates a thermal alert. Connect to motherboard's SMBus Alert signal. |
| PRSNT1# | GND | Card present detect, indicates if MXM module is present. Tie to pull-up on motherboard. If high then MXM is not present. If low then MXM is present. Can be used to control IGP upgrade multiplexers |

FIG. 5B

| Signal Name | Input/Output | Description |
|---|---|---|
| PRSNT2# | GND | Tied to Ground on both motherboard and MXM. Reserved for future functionality. |
| CLK_REQ# | Output, active low | Indicates need for PEX_REFCLK |
| PEX_RST# | Input, active low | PCI_Express reset |
| PEX_REFCLK, PEX_REFCLK# | Input, 100 Ohm Diff | PCI-Express reference clock. |
| PEX_TX0-15, PEX_TX0-15# | Input, 100 Ohm Diff | PCI-Express 16 lanes, output from northbridge |
| PEX_RX0-15, PEX_RX0-15# | Output, 100 Ohm Diff | PCI-Express 16 lanes, input to northbridge |
| RUNPWROK | Input | Indicates that all power to the MXM is within the specified tolerances |
| 3V3RUN | Power input | 3.3 V run power |
| 5VRUN | Power input | 5 V run power |
| 2V5RUN | Power input | 2.5 V run power |
| 1V8RUN | Power input | 1.8 V run power |
| PWR_SRC | Power input | Battery power |

FIG. 5C

| Voltage Rail | Voltage | Current | Power | Notes |
|---|---|---|---|---|
| 3V3RUN | 3.3 V +/- 5% | 1.5 Amps | 4.95 W | 3.3 V run |
| 5VRUN | 5 V +/- 5% | 0.5 Amps | 2.5 W | 5 V run |
| 2V5RUN | 2.5 V +/- 5% | 0.5 Amps | 1.25 W | 2.5 V run |
| 1V8RUN | 1.8 V +/- 5% | 3.5 Amps | 6.3 W | 1.8 V run |
| PWR_SRC | 7.5 V to 22 V | Up to 4 Amps | 8.9 W to 38.9 W | Battery, store power capability in MXM system information ROM |

FIG. 6

METHOD AND APPARATUS FOR ROUTING GRAPHICS PROCESSING SIGNALS TO A STAND-ALONE MODULE

CROSS REFERENCE TO RELATED APPLICATIONS

This application is a continuation-in-part of U.S. patent application Ser. No. 10/822,015, filed Apr. 9, 2004 by Diamond et al. (entitled "Field Changeable Rendering System for a Computing Device"), which is herein incorporated by reference in its entirety.

BACKGROUND OF THE INVENTION

1. Field of the Invention

This invention relates generally to computer hardware and relates more particularly to a connector for coupling a stand-alone graphics module to a computing device.

2. Description of the Background Art

Contemporary computing devices typically incorporate a graphics card that enables a computing device to rapidly process graphics related data for graphics intensive applications, such as gaming applications. A graphics card generally comprises a printed circuit board (PCB) upon which a plurality of circuit components (such as memory chips and the like) and a graphics processing unit (GPU) are mounted. In "closed platform" computing devices such as laptop computers, cellular telephones and personal digital assistants (PDAs) (i.e., devices that use processors and are not easily changed by a user), the graphics card is mounted directly and permanently to the motherboard of the computing device.

One drawback to mounting the graphics card directly to the motherboard is that this fixed configuration impedes a user's ability to upgrade the computing device's graphics system. Specifically, in order to take advantage of an improved graphics system, the user typically must purchase an entirely new computing device, which is much more costly than a simple replacement of the graphics system in the existing computing device.

A second drawback is that the pace of graphics innovations that can be conveniently delivered to computing device users is hindered, because the implementation of on-board devices is typically limited by a design cycle of approximately nine to twelve months and because of the form factor power delivery, thermal management and physical size.

Thus, there is a need in the art for a method and apparatus for routing graphics processing signals to a stand-alone module.

SUMMARY OF THE INVENTION

One embodiment of a connector for a stand-alone graphics module is adapted for coupling a computing device to the stand-alone graphics module, which is external to the computing device. The connector is adapted for receiving PCI express signal from the computing device and for delivering the PCI express signal to the stand-alone graphics module. The connector is further adapted for receiving display output signals from the stand-alone graphics module and delivering the display output signals to the computing system, e.g., for use in accordance with one or more output display panels coupled to said computing device.

One embodiment of a method for routing graphics processing signals from a computing device to an external, stand-alone module includes detecting a connection between the computing device and the stand-alone module and outputting a PCI express signal from the computing device to the stand-alone module, e.g., via the connector described above.

BRIEF DESCRIPTION OF THE DRAWINGS

FIGS. 4A-B are tables illustrating one embodiment of a pinout for the edge connector illustrated in FIG.2;

FIGS. 5A-C are tables containing contact pin descriptions for each signal type identified in FIGS. 4A-B;

FIG. 6 is a table summarizing the power that must be supplied through an edge connector from a motherboard to a graphics card, according to one embodiment of the present invention;

DETAILED DESCRIPTION OF THE INVENTION

Figure 1:
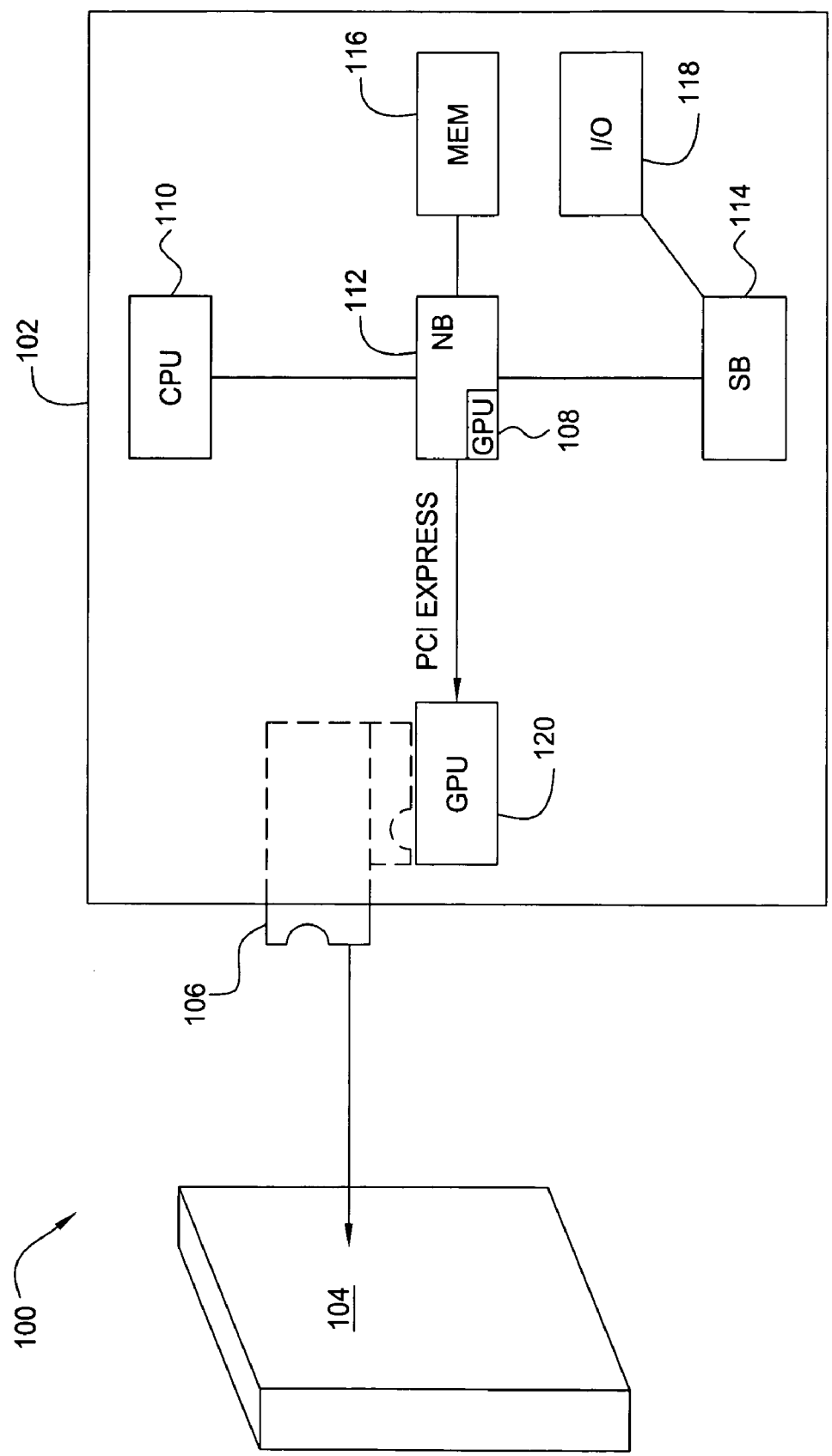
FIG. 1 is a schematic diagram illustrating a computing system incorporating stand-alone graphics, according to one embodiment of the present invention.

FIG. 1 is a schematic diagram illustrating an exemplary computing system 100 incorporating stand-alone graphics, according to one embodiment of the present invention. As illustrated, the computing system 100 comprises a computing device 102 and a stand-alone graphics module 104 coupled by a connector 106. Stand-alone graphics module 104 is adaptable for use with any type of computing device, including, without limitation, a desktop computer, server, laptop computer, palm-sized computer, personal digital assistant, tablet computer, game console, cellular telephone, computer-based simulator and the like.

The configuration of computing device 102 is thus an exemplary system, and is not intended to in any way imply a limitation as to the types of computing devices that may be used to advantage with embodiments of the present invention. As illustrated, computing device 102 generally comprises a plurality of internal components, including, without limitation, a central processing unit (CPU) 110, memory 116, one or more input/output (I/O) devices 118, a Northbridge chip set 112, a Southbridge chip set 114, a standard integrated graphics processor (IGP) 108 that is a sub-component of the Northbridge chip set 112, and a discrete, fixed rendering including a graphics processing unit (GPU) 120. Typically, Northbridge chip set 112 outputs a PCI express signal to IGP 108, which in turn generates a plurality of display output signals for various output display panels (not shown), such as video graphics array (VGA), television (TV), low voltage differential signaling (LVDS) and digital video interface (DVI) signals.

Stand-alone graphics module 104 is an external (e.g., external to computing device 102) device configured to be coupled to computing device 102 in order to provide graphics processing power to computing device 102. In one embodiment, stand-alone graphics module 104 is positioned a user-defined distance away from computing device 102 and has its own power supply, thermal budget and mechanical budget. Generally, stand-alone graphics module 104 is configured to exchangeably receive one or more graphics cards (not shown) for external interface to computing device 102. In one embodiment, stand-alone graphics module 104 is adapted to receive one or more field-changeable graphics cards.

One advantage of system 100 is that it enables a user to maximize the graphics capabilities of an existing computing device (e.g., computing device 102), regardless of the computing device's inherent thermal, form factor or other power limitations. Thus, system 100 thus allows a user to upgrade the graphics processing power of computing device 102 with little or no modification to the fixed architecture of computing device 102. A user may simply purchase one or more individual graphics cards, connect stand-alone graphics module 104 to computing device 102 (e.g., via connector 106), and insert the graphics cards into stand-alone graphics module 104, thereby externally interfacing computing device 102 to the graphics cards. Moreover, graphics cards are easily removed from stand-alone graphics module 104; further graphics system upgrades are therefore simply a matter of purchasing a new graphics card for use in addition to or in place of an existing graphics card.

Figure 2:
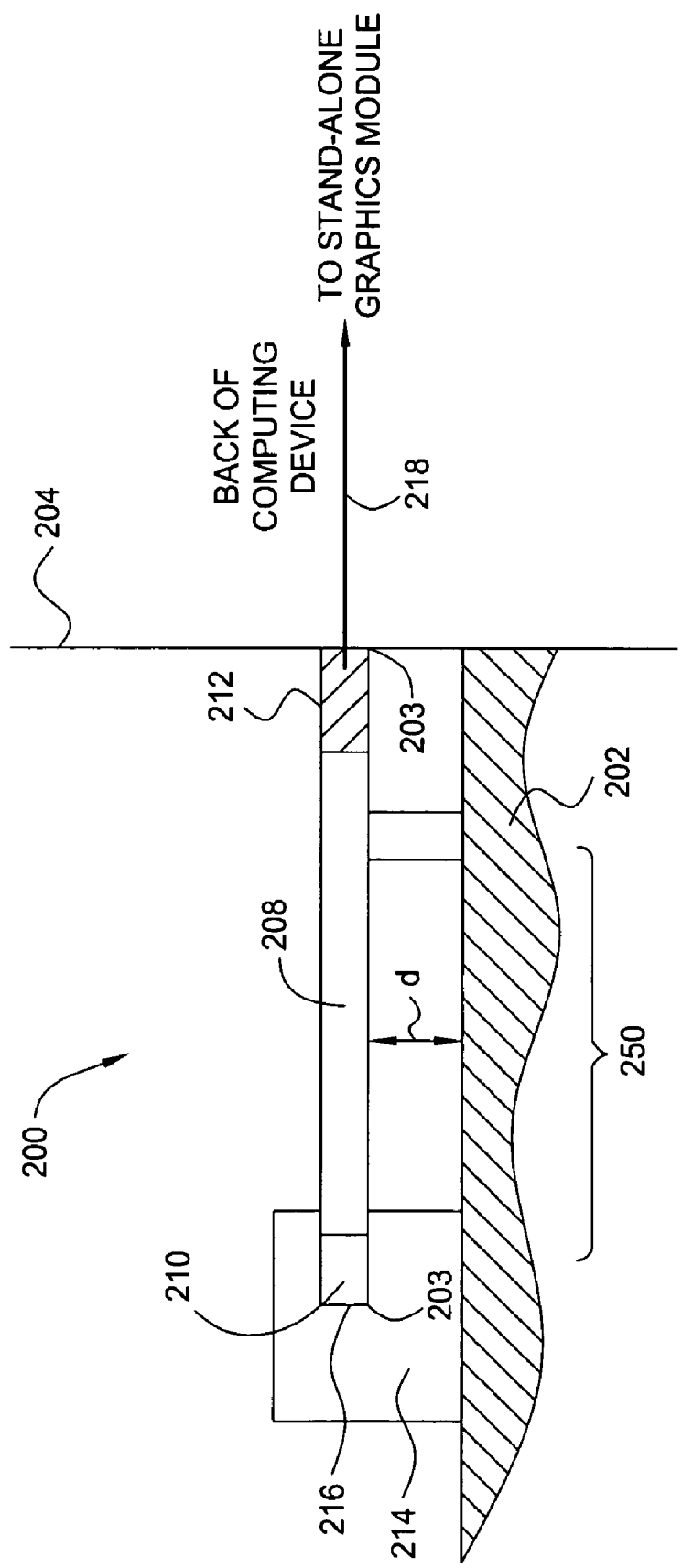
FIG. 2 is a side view of one embodiment of a connector interfaced to a portion of a computing device's motherboard.

FIG. 2 is a side view of one embodiment of a connector 200 interfaced to a portion of a computing device's motherboard 202. Similar to connector 106 illustrated in FIG. 1, connector 200 is adapted to couple computing device 204 to a stand-alone graphics module. Specifically, connector 200 is adapted to receive a PCI Express signal from a computing device (e.g., from a Northbridge chip set) and deliver the PCI Express signal to a stand-along graphics module for the generation of one or more display output signals, as described in further detail below. Connector 200 therefore functions as a bridge or bus from computing device 102 to stand-alone graphics module 104.

In one embodiment, connector 200 is a removable, card-shaped connector having physical and mechanical dimensions that are compatible with the computing device's internal mechanical constraints. In one embodiment, connector 200 has dimensions similar to any of the field-changeable graphics cards described in co-pending, commonly assign U.S. patent application Ser. No. 10/822,014, filed Apr. 9, 2004, which is herein incorporated by reference.

Connector 200 generally comprises a printed circuit board (PCB) 208 (having a plurality of circuit components disposed thereon), a card connector 210 (e.g., comprising a plurality of plated contacts) and an external interface 212. Card connector 210 is disposed along a first edge 201 of PCB 208 and is adapted to interface with an edge connector mounted to the computing device's motherboard 202, as described in further detail below. External interface 212 is disposed along another edge of PCB 208 (e.g., in one embodiment a second edge 203 opposite first edge 201) and is adapted for coupling to, for example, a serial cable 218 that connects connector 200 to a stand-alone graphics module. In other embodiments, other means of connection including, but not limited to, an FR4 strip connector or a connector-to-connector docking station, may be used to connect connector 200 to a stand-alone graphics module.

In one embodiment, edge connector 214 is configured in a manner similar to the edge connector described in U.S. patent application Ser. No. 10/822,015. Edge connector 214 includes a slot 216 that is adapted to receive card connector 210 of connector 200. In one embodiment, slot 216 includes a plurality of connector pins (not shown) that directly contact card connector 210, including at least one connector pin that is configured to detect the presence of connector 200. In one embodiment, if connector 200 is not detected, computing device 204 operates in a standard IGP or on-board discrete graphics mode as described above. Once connector 200 is detected (e.g., at start-up or with a hot-plug), stand-alone graphics module 104 is mapped into the system 100 and graphics sub-system, bypassing the IGP or on-board discrete graphics system.

Figure 3:
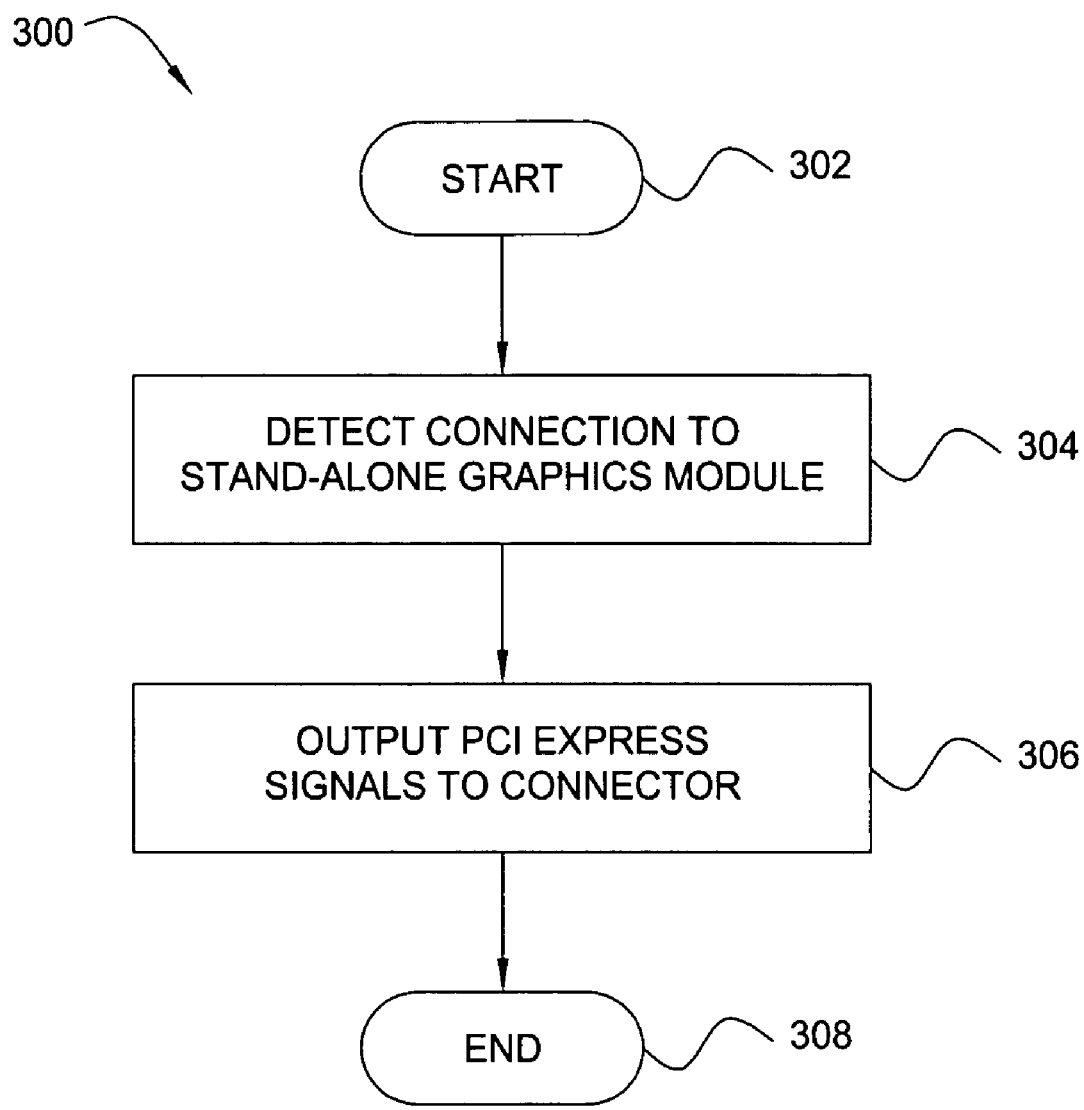
FIG. 3. is a flow diagram of one embodiment of a method for routing graphics signals from a computing device to an external, stand-alone graphics module.

FIG. 3. is a flow diagram of one embodiment of a method 300 for routing graphics signals from a computing device (e.g., computing device 204) to an external, stand-alone graphics module. The method 300 is initialized at step 302 and proceeds to step 304, where the method 300 detects a connection to a stand-alone graphics module. In one embodiment, the connection is indicated when the at least one connector pin on edge connector 214 detects the presence of connector 200.

Once a connection has been detected, the method 300 proceeds to step 306 and outputs PCI express signals to connector 200. In one embodiment, this is accomplished by sending a signal, via edge connector 214, to the Northbridge chip set (e.g., Northbridge chip set 112 of FIG. 1) indicating that connector 200 is present in computing device 204. Consequently, the Northbridge chip set outputs PCI express signals to connector 200 (e.g., rather than to an IGP or other fixed rendering device), in one embodiment connecting the PCI express signals through one or more connector pins on edge connector 114. Connector 200 completes the circuit paths between the PCI express signals and the stand-alone graphics module, e.g., over serial cabling. The method 300 terminates in step 308. Thus, connector 200, in conjunction with edge connector 214, enables a computing device user to implement an alternative (e.g., non-fixed) graphics system without the need to replace computing device 204.

Although the connector 200 has been described in the context of a standardized, field changeable card, the present invention may be deployed in other form factors such as credit card polymer substrates with embedded chips, and postage stamp-sized, self-contained devices, among others.

In one embodiment, display output signals (e.g., TV, VGA, LVDS, DVI signals and the like) may be sent from the stand-alone graphics module back to the computing device, in order to use integrated display options, e.g., in accordance with application Ser. No. 10/822,015.

In another embodiment, a connector for coupling a computing device to an external, stand-alone graphics module according to the present invention is a fixed external port built into the computing device. The port functions in substantially the same way as the removable connector 200, e.g., in accordance with method 300. In one embodiment, the port detects a connection to a stand-alone graphics module over a connection via a serial cable, an FR4 connector strip, a connector-to-connector docking station, bundled wire cable, flexible Mylar® substrates printed with metal (e.g., copper) traces, shielding and protective plastic coating or other serial coupling means connected to the port.

FIGS. 4A-B are tables illustrating one embodiment of a pinout for edge connector 200. Each contact pin on edge connector 200 is associated with an individual signal (e.g., power input, ground and the like). In the embodiment illustrated, edge connector 200 utilizes a 230-pin card-edge connection system, wherein contact pins on edge connector 200 are rated for 0.5 a stead state current. FIGS. 5A-C are tables containing contact pin descriptions for each signal type identified in FIGS. 4A-B. Input/output classifications in FIGS. 5A-C are relative to a GPU mounted on the graphics card. References to "MXM module" indicate a graphics card according to the present invention.

FIG. 6 is a table summarizing the power that must be supplied by the motherboard to a graphics card, i.e., through edge connector 200, according to one embodiment of the present invention. If the motherboard's power supply equals or exceeds the power requirements summarized in FIG. 6, a graphics card interfaced to an edge connector according to the present invention (e.g., edge connector 200) will run at full speed. However, the interface will also allow a graphics card to detect power supply limitations of the motherboard and to automatically throttle its clocks to stay within the limits of the available power.

In addition to the power requirements summarized in FIG. 6, a motherboard must meet a plurality of additional system requirements in order to effectively interface to a graphics system of the present invention. For example, in one embodiment, the motherboard is required to place a serial ROM that connects to the DDCC_DAT and DDCC_CLK signals (e.g., connector pins 220 and 222 in FIG. 4B). In addition, the motherboard must provide back drive isolation and level shifting, for all DDC lines, VGA_HSYNC and VGA_VSYNC signals (e.g., connector pins 151 and 153). Furthermore, the motherboard must provide power to the computing device LVDS panel, and must route all RGB signals and TV_out signals with 37.5 Ohms impedance. In one embodiment, the motherboard is also required to have output filters on all VGA output lines and on all TV output lines, the filters being positioned as closely as possible to the connector pins. Input filters are required on the DVI_B_HPD and DVI_A_HPD lines (e.g., connector pins 191 and 217), and the graphics card will provide level shifting and clamping for the DVI_B_HPD and DVI_A_HPD signals.

In one embodiment, an edge connector according to the present invention (e.g., edge connector 200) is adapted to detect a graphics mode of a computing device, and to cause interfaces to be routed from a graphics card to the motherboard accordingly. Specifically, the PRSNT#1 connector pin on the edge connector (e.g., pin 134 in the pinout of FIGS. 4A-B) is adapted to detect if a graphics upgrade, such as any one of the graphics cards disclosed in U.S. patent application Ser. No. 10/822,014, filed on Apr. 9, 2004, has been implemented in the computing device. In one embodiment, a voltage detected by the PRSNT#1 connector pin indicates that the presence of a graphics upgrade. For example, a high voltage detected by the PRSNT#1 connector pin indicates that a "dummy" or "loop-through" card (e.g., a card with no graphics processing unit) is interfaced to the edge connector, as explained in further detail in conjunction with FIGS. 7A and 8A below. Alternatively, a low voltage detected by the PRSNT#1 connector pin indicates that a graphics upgrade such as a graphics card is interfaced to the edge connector, as explained in further detail in conjunction with FIGS. 7B and 8B below.

Figure 7A:
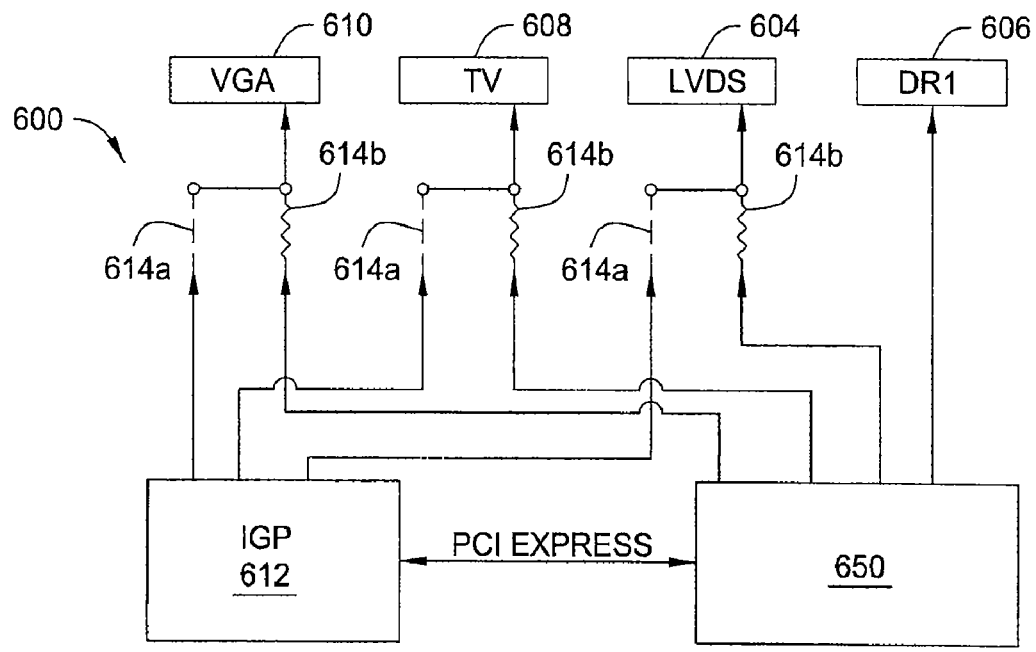
FIG. 7A is a schematic diagram illustrating a configurable graphics system according to one embodiment of the present invention.

FIG. 7A is a schematic diagram illustrating a configurable graphics system 600, according to one embodiment of the present invention. The output topology illustrated in FIG. 7A depicts a manufacturing-end graphics configuration (i.e., graphics system 600 is incorporated during assembly of the computing device). Graphics system 600 comprises a fixed (e.g., mounted to the motherboard) rendering device such as a standard integrated graphics processor (IGP) 6121 (driven in one embodiment by a Northbridge chip set, not shown), a loop-through card 650, and a plurality of output display panels 604-610 for video graphics array (VGA), television (TV), low voltage differential signaling (LVDS) and digital video interface (DVI) signals, all interfaced to a motherboard. The display output signals are generated by IGP 612 in conjunction with loop-through card 650, as described further below.

Loop-through card 650 may be implemented in graphics system 600 in place of a conventional LVDS capable device. As described above, the PRSNT#1 connector pin on the edge connector detects a high voltage and sends a corresponding signal to the Northbridge chip set indicating the presence of loop-through card 650. Consequently, the Northbridge outputs LVDS signals to the edge connector, in one embodiment connecting to the signals to the IGP_LVDS connector pins. The passive loop-through card 650 completes the circuit paths between the output signals and the LVDS panel input signals. Thus, the edge connector, in conjunction with loop-through card 650, enables a computing device user to implement LVDS features without the need to implement complex (and costly) traditional LVDS-capable devices.

In one embodiment, the graphics system 600 further supports DVI. In this embodiment, DVI signals are output to the DVI_A connector pins (e.g., connector pins 219, 221, 225, 227, 231, 233, 237 and 239 in FIG. 4B) on the edge connector and routed to loop-through card 650, which further comprises a discrete rendering device such as a transmission minimized differential signaling (TMDS) transmitter for driving TMDS outputs on received signals. TV and VGA signals are output form the Northbridge chip set to IGP 612 in accordance with standard IGP operation.

In one embodiment, graphics system 600 further comprises a plurality of stuffing resistors 614a and 614b (shown in phantom) adapted for completing the circuits from IGP 612 and from loop-through card 650 to output display panels 604-610. During assembly of a computing system, a manufacturer may configure graphics system 600 to operate in the mode described (e.g., incorporating loop-through card 650) by closing the circuit paths through resistors 614a and leaving the circuit paths through resistors 614b open.

Figure 7B:
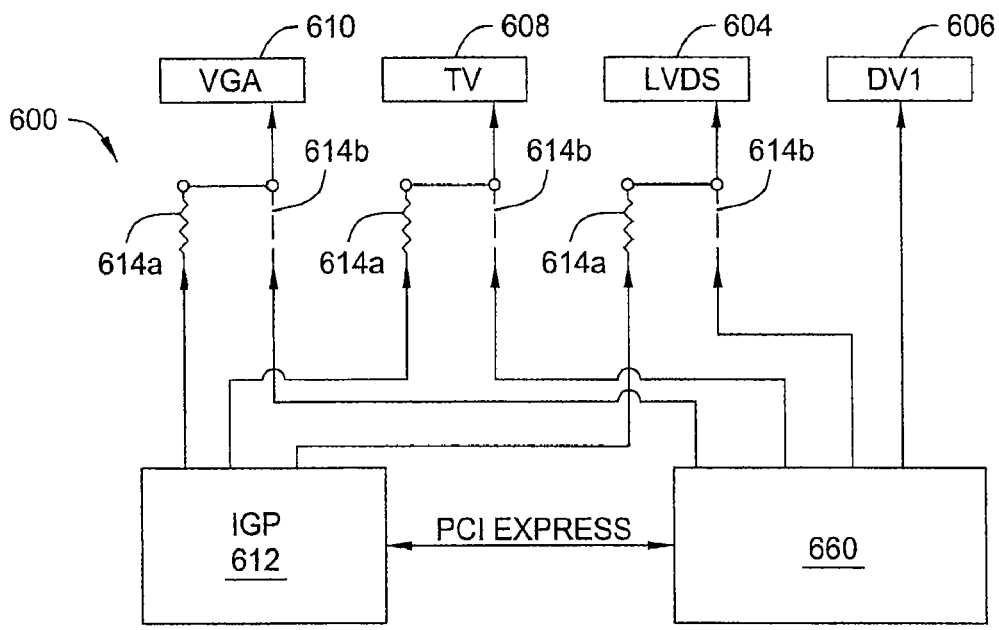
FIG. 7B is a schematic diagram illustrating graphics system according to another embodiment of the present invention.

Alternatively, as illustrated in FIG.7B, a manufacturer may close the circuit paths through resistors 614b and leave the circuit paths through resistors 614a open, in order to implement an active graphics card. In this embodiment, graphics system 600 comprises a graphics card 660 in place of loopotrhough card 650. Graphics card 660 may be configured in a manner similar to any one of the graphics cards described in U.S. patent application Ser. No. 10/822,014, filed on Apr. 9, 2004, and includes a discrete rendering device such as a graphics processing unit. Graphics card 660 generates substantially all display output signals, as described further below.

As described above, the PRSNT#1 connector pin on the edge connector detects a low voltage and sends a corresponding signal to the Northbridge chip set indicating the presence of graphics card 660. Consequently, the Northbridge outputs a peripheral component interface (PCI) Express signal to the edge connector, which routes the signal to graphics card 660. VGA, TV, LVDS and DVI signals are subsequently generated by graphics card 660. As described above, stuffing resistors 614b complete the circuits from graphics card 660 to display panels 604-610.

Figure 8A:
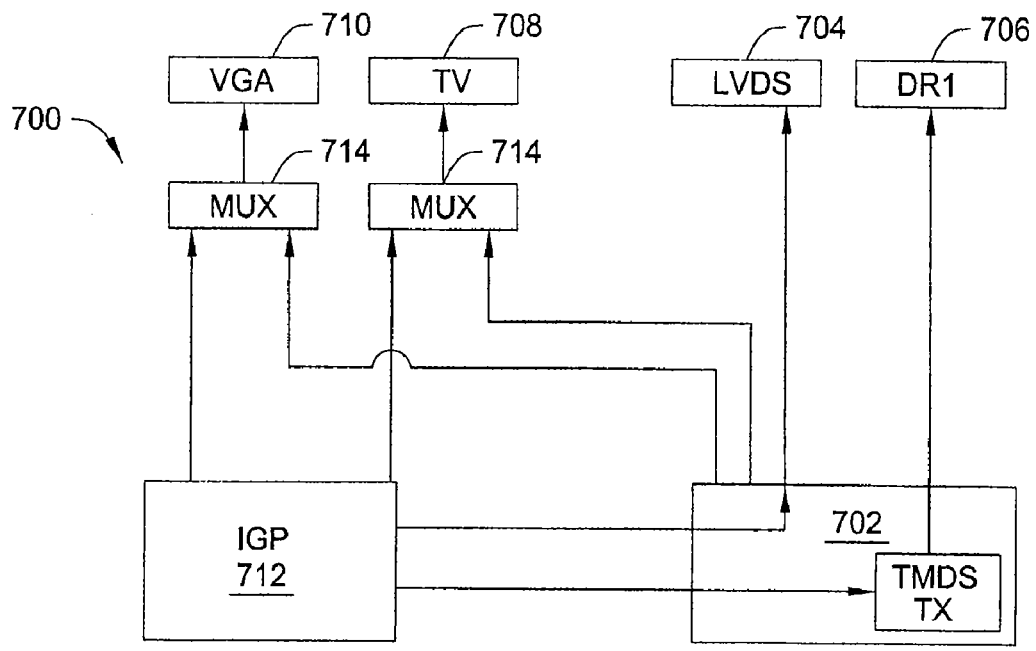
FIG.8A is a schematic diagram illustrating a user-upgradeable graphics system, according to one embodiment of the present invention.

FIG. 8A is a schematic diagram illustrating a graphics system 700 according to one embodiment of the present invention. The output topology illustrated in FIG. 8A depicts a user-upgradeable configuration. That is, a user may upgrade graphics system 700 on demand, by simply exchanging one field-exchangeable graphics card for another. Graphics system 700 is substantially similar to graphics system 600 illustrated in FIG. 7A and comprises an IGP 712, a loop0through card 702, and a plurality of display panels 704-710 for VGA, TV, LVDS and DVI signals. The display output signals are generated by IGP 712 in conjunction with loop-through card 702, as described further below.

LVDS and DVI signals are output by the Northbridge to the edge connector as described above in conjunction with FIG. 7A. the passive loop-through card 702 completes the circuit paths between the output signals and the LVDS and DVI panel input signals. TV And VGA signals are output form the Northbridge chip set to IGP 712 in accordance with standard IGP operation. In one embodiment, graphics system 700 further comprises a plurality of muxes 714 adapted for receiving and transmitting IGP-initiated signals (e.g. for VGA and TV signals). During assembly of a computing system, a manufacturer may configure graphics system 700 to operate in the mode illustrated in FIG. 8A (e.g., incorporated loop-through card 702) as a default.

Figure 8B:
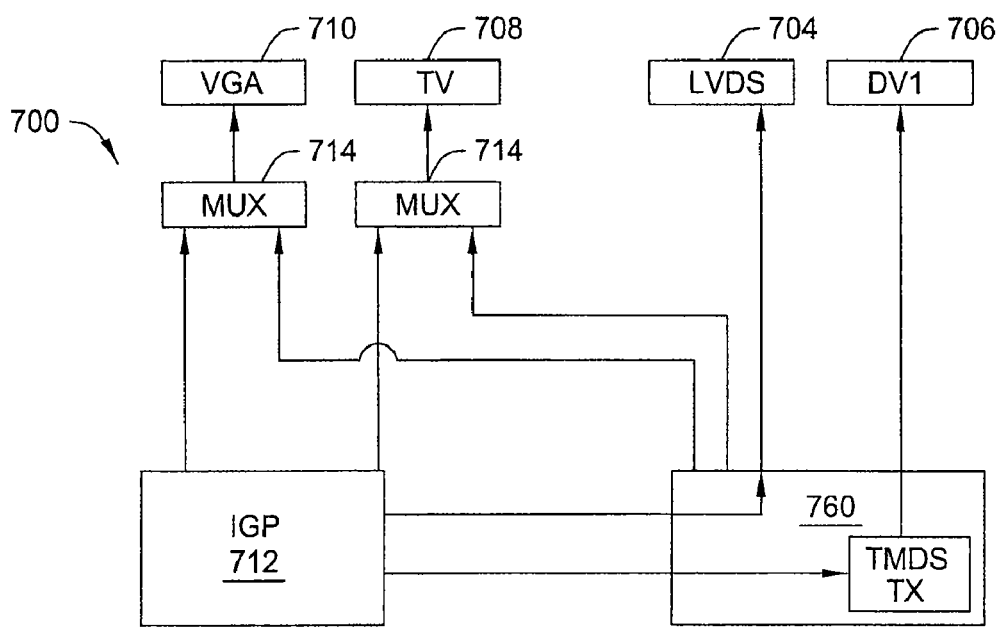
FIG. 8B is a schematic diagram illustrating a user-upgradeable graphics system, according to another embodiment of the present invention.

FIG. 8B is a schematic diagram illustrating graphics system 700 in an upgraded mode. Graphics system 700 is substantially similar to graphics system 600 illustrated in FIG. 7B and comprises an IGP 702, a plurality of display panels 704-710 for VGA, TV, LVDS and DVI signals and an active graphics card 760 in place of loop-through card 702.

When the presence of graphics card 760 is detected, the Northbridge sends a PCI Express signal through the edge connector and to graphics card 760. Muxes 714 are configured to automatically reconfigure to connect VGA and TV circuit paths to graphics card 760.

An edge connector according to the present invention may thus be configured to enable a computing device user to upgrade an existing device's graphics system with minimal expense. Because the edge connector is adapted to work with a plurality of field=changeable graphics cards, the user is not forced to purchase an entirely new computing device in order to take advantage of graphics innovations. This advantage is particularly significant for users of portable computing devise, such as laptop computers and PDAs, in which graphics systems are frequently difficult or impossible to alter.

A further advantage of the disclosed edge connector is that it enables upgrades to LVDS features. Typical devices capable of operating at LVDS data rates tend to be rather costly. However, by configuring the edge connector of the present invention to enable LVDS signals to "loop-through" a passive card, the versatility of the graphics system is enhanced with minimal cost to the user.

Moreover, through the present invention has been described in terms of graphics cards, those skilled in the art will appreciate that the invention may be adapted for use with other devices that era typically hardwired to a motherboard, such as audio chips and the like.

Thus, the present invention represents a significant advancement in the field of computing device graphics systems. An edge connector is provided that enables a plurality of the field-changeable graphics system to interface to a single computing device motherboard. The edge connector thus maximizes the graphics options that may be implemented in an existing computing device, allowing computing device users greater ability to take advantage of graphics innovations.

Furthermore, the present invention grants more flexibility to computing device manufacturers, since it removes the approximately nine to twelve month design cycle for on-board implementations. The present invention also enables the build-to-order, stock-to-order and field repair of any of the systems disclosed, which is a significant advancement for a global economy having needs for just-in-time manufacturing and inventory management.

Those skilled in the art will appreciate that although the present invention has been described in the context of closed platform computing devices such as laptop computers, cellular telephones and PDAs, the present invention may be adapted for use with any device that uses a processor and is not easily changed by a user, such as automotive navigation systems, entertainment systems, all-in-one personal computers, printers and the like. Moreover, although the present invention has been described in the context of standardized, field changeable graphics cards, the present invention may be deployed in other form factors such as credit card polymer substrates with embedded chips, and postage stamp-sized, self-contained devices, among others.

Although a computing device has been described as being coupled to a stand-alone graphics module via a serial cable, those skilled in the art will appreciate that any other connection means having the bandwidth necessary to transmit PCI express signals from the computing device to the stand-alone graphics module may be deployed, including FR4 strip connections, bundled wire cable and flexible Mylar® substrates printed with metal (e.g., copper) traces, shielding and protective plastic coating. In one embodiment, the connection means is a standard sixteen-lane connection. In another embodiment, the length and dimensions of the connection means is adjusted in accordance with power optimization concerns for the particular computing device platform (e.g., laptop computer, desktop computer, etc.) being coupled to the stand-alone graphics module.

A connector according to the present invention may thus be configured to enable a computing device user to upgrade or maximize an existing device's graphics system with minimal expense and minimal modification to the existing device's architecture (e.g., regardless of the existing device's inherent thermal, form factor or other power limitations). Because the connector is adapted to couple the computing device to an external, stand-alone graphics module (e.g., comprising one or more field-changeable graphics cards), the user is not forced to purchase an entirely new computing device in order to take advantage of graphics innovations. This advantage is particularly significant for users of portable computing devices, such as laptop computers and PDAs, in which graphics systems are frequently difficult or impossible to alter.

A further advantage of the disclosed edge connector is that it enables graphics innovations to be delivered to end-users at a much faster pace. Rather than wait for graphics innovations to be incorporated into next-generation computing platforms (the commercial availability of which may not reflect the pace of innovation, e.g., an approximately nine to twelve month design cycle for on-board implementations is typical), suppliers of graphics innovations can commercially release products as they are developed, and users can incorporate these products into existing platforms as described above. The present invention also enables the build-to-order, stock-to-order and field repair of any of the systems disclosed, which is a significant advancement for a global economy having needs for just-in-time manufacturing and inventory management.

Moreover, though the present invention has been described in terms of graphics cards, those skilled in the art will appreciate that the invention may be adapted for use with other devices that are typically hardwired to a motherboard, such as audio chips and the like.

Those skilled in the art will appreciate that although the present invention has been described in the context of closed platform computing devices such as laptop computers, cellular telephones and PDAs, the present invention may be adapted for use with any device that uses a processor and is not easily changed by a user, such as automotive navigation systems, entertainment systems, all-in-one personal computers, printers and the like.

Although the invention has been described above with reference to specific embodiments, persons skilled in the art will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A connector for coupling a computing device to a stand-alone module containing one or more graphics processors, said connector comprising:
   a bridge card adapted to be inserted into a connection slot of the computing device that has a first set of pins for TV signals, a second set of pins for VGA signals, a third set of pins for LVDS signals, and a fourth set of pins for DVI signals; and
   a connection interface for said stand-alone module,
   wherein said stand-alone module is external to said computing device, and
   wherein said bridge card is configured to receive and transmit PCI express signals and to transmit TV signals, VGA signals, LVDS signals, and DVI signals received from the stand-alone module to the computing device respectively through said first, second, third, and fourth sets of pins of said connection slot.

2. The connector of claim 1, wherein said connection interface is adapted to be coupled to said stand-alone module through a serial cable.

3. The connector of claim 1, wherein said connection interface is adapted to be coupled to said stand-alone module through an FR4 strip connector.

4. The connector of claim 1, wherein said connection interface is adapted to be coupled to said stand-alone module by a sixteen-lane connection.

5. The connector of claim 1, wherein said bridge card has a plurality of plated contacts disposed an edge thereof that is inserted into the connection slot.

6. The connector of claim 5, wherein said connection slot is adapted for routing PCI express signals from a Northbridge chip set to said bridge card.

7. The connector of claim 5, wherein the plated contacts are provided on opposing sides of the edge of the bridge card.

8. The connector of claim 7, wherein the total number of said plated contacts is 230.

9. The connector of claim 1, wherein the bridge card has first, second, third, and fourth sets of plated contacts that are to be respectively engaged with said first, second, third, and fourth sets of pins of said connection slot.

10. A method for routing graphics processing signals between a computing device and a stand-alone module external to said computing device through an edge connector of said computing device and a connection card inserted into the edge connector, the method comprising the steps of:
    detecting a connection between said computing device and said stand-alone module;
    outputting a PCI express signals from said computing device to said stand-alone module through said edge connector and said connection card;
    generating PCI express signals comprising display output signals by said stand-alone module; and
    supplying said display output signals to said computing device through said connection card and said edge connector that has TV signal pins, VGA signal pins, LVDS signal pins, and DVI signal pins.

11. The method of claim 10, wherein the PCI express signals are transmitted between said computing device and said stand-alone module over a serial cable.

12. The method of claim 10, wherein the PCI express signals are transmitted between said computing device and said stand-alone module over an FR4 strip connector.

13. The method of claim 10, wherein said detecting step comprises:
    detecting the presence of said connection card in said edge connector.

14. The method of claim 13, wherein said detecting step is performed sensing a voltage level on a connection pin provided on said edge connector.

15. The method of claim 14, wherein said outputting step comprises:
    routing said PCI express signals from a Northbridge chip set in said computing device to said stand-alone module via said edge connector.

16. The method of claim 10, wherein said display output signals include at least one of TV signals, VGA signals, LVDS signals, and DVI signals, and are transmitted through corresponding TV signal pins, VGA signal pins, LVDS signal pins, and DVI signal pins provided on said edge connector.

* * * * *

UNITED STATES PATENT AND TRADEMARK OFFICE
CERTIFICATE OF CORRECTION

PATENT NO. : 7,324,111 B2 Page 1 of 1
APPLICATION NO. : 10/879877
DATED : January 29, 2008
INVENTOR(S) : Michael B. Diamond It is certified that error appears in the above-identified patent and that said Letters Patent is hereby corrected as shown below:

In column 10, line 17, please replace "outputting a PCI express signals" with
-- outputting PCI express signals --

Signed and Sealed this

Fifth Day of August, 2008

JON W. DUDAS
*Director of the United States Patent and Trademark Office*